US012722121B2

(12) United States Patent
Doung et al.

(10) Patent No.: US 12,722,121 B2
(45) Date of Patent: Sep. 1, 2026

(54) CHLORINE TOLERANCE OF CONTINUOUS ELECTRODEIONIZATION MODULES

(71) Applicant: Evoqua Water Technologies LLC, Pittsburgh, PA (US)

(72) Inventors: Seveing Doung, Lowell, MA (US); Jonathan H. Wood, Needham, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 877 days.

(21) Appl. No.: 17/917,864

(22) PCT Filed: May 6, 2021

(86) PCT No.: PCT/US2021/031094
§ 371 (c)(1),
(2) Date: Oct. 7, 2022

(87) PCT Pub. No.: WO2021/226337
PCT Pub. Date: Nov. 11, 2021

(65) Prior Publication Data

US 2023/0149857 A1 May 18, 2023

Related U.S. Application Data

(60) Provisional application No. 63/071,541, filed on Aug. 28, 2020, provisional application No. 63/020,763, filed on May 6, 2020.

(51) Int. Cl.
*B01D 61/48* (2006.01)
*C02F 1/469* (2023.01)
*C02F 101/10* (2006.01)

(52) U.S. Cl.
CPC .......... *B01D 61/485* (2013.01); *C02F 1/4695* (2013.01); *B01D 2313/30* (2013.01); *C02F 2101/10* (2013.01)

(58) Field of Classification Search
CPC .. B01D 61/485; B01D 2313/30; C02F 1/4695
(Continued)

(56) References Cited

U.S. PATENT DOCUMENTS 4,298,442 A 11/1981 Giuffrida
5,308,466 A * 5/1994 Ganzi .................. C02F 1/4695 204/632

(Continued)

FOREIGN PATENT DOCUMENTS

CN 102674596 A 9/2012
JP 2003311276 A 11/2003

(Continued)

OTHER PUBLICATIONS

"DOWEX MONOSPHERE 650C (H)" Lenntech (2006) (Year: 2006).*

(Continued)

*Primary Examiner* — Luan V Van
*Assistant Examiner* — Alexander R. Parent

(57) ABSTRACT

Electrochemical water treatment devices are disclosed. The device includes a feed inlet fluidly connectable to a source of water including dissolved silica and a chlorine-containing compound and an electrochemical separation module fluidly connectable to the feed inlet. The electrochemical separation module includes a dilution compartment, a concentration compartment, an ion exchange membrane positioned between the dilution and concentration compartment, and first and second electrodes. A first portion of a volume of the dilution compartment includes a first ion exchange media positioned proximate to the feed inlet. A second portion of the volume of the dilution compartment includes a second ion exchange media positioned distal to the feed inlet. The first ion exchange media has a greater resistance to the chlorine-containing compound than the second ion
(Continued)

exchange media. Methods of reducing a concentration of dissolved silica in water are disclosed. Methods of facilitating treatment of water containing dissolved silica are disclosed.

23 Claims, 9 Drawing Sheets

(58) Field of Classification Search
USPC .......................................................... 204/632
See application file for complete search history.

(56) References Cited

U.S. PATENT DOCUMENTS

| | | | | |
|---|---|---|---|---|
| 5,858,191 | A * | 1/1999 | DiMascio | B01D 61/48 204/647 |
| 5,868,915 | A | 2/1999 | Ganzi et al. | |
| 6,312,577 | B1 | 11/2001 | Ganzi et al. | |
| 2002/0011413 | A1* | 1/2002 | DiMascio | B01D 61/48 204/632 |
| 2004/0089551 | A1* | 5/2004 | Liang | B01D 61/48 204/632 |
| 2005/0103630 | A1 | 5/2005 | Ganzi et al. | |
| 2006/0091014 | A1* | 5/2006 | Inoue | B01D 61/48 521/142 |
| 2008/0067069 | A1* | 3/2008 | Gifford | C02F 1/4602 204/632 |
| 2011/0120886 | A1 | 5/2011 | Jha et al. | |
| 2015/0344332 | A1 | 12/2015 | Gu | |
| 2016/0002076 | A1 | 1/2016 | Jha et al. | |
| 2017/0362097 | A1 | 12/2017 | Mertz et al. | |

FOREIGN PATENT DOCUMENTS

| | | | |
|---|---|---|---|
| JP | 2005508729 | A | 4/2005 |
| JP | 2020018970 | A | 2/2020 |
| WO | 2016028972 | A1 | 2/2016 |

OTHER PUBLICATIONS

"DOWEX™ MARATHON™ 11" Lenntech (2016) (Year: 2016).*
"DOWEX™ MARATHON™ A Resin" Lenntech (2013) (Year: 2013).*
"DOWEX™ MARATHON™ A2" Lenntech (2016) (Year: 2016).*
Liu et al. "A deep desalination and anti-scaling electrodeionization (EDI) process for high purity water preparation" Desalination 468 (2019) 114075 (Year: 2019).*
Aida, Hajime, "Notice of Reasons for Refusal", Japanese Patent Application No. 2022-566426, mailed Mar. 4, 2025.
Yan, Zhao, "Written Opinion", Singapore Patent Application No. 11202254586P, mailed Jul. 22, 2024.
Wolf, Gundula, "Extended European Search Report", European Patent Application No. 21799993.7, mailed Apr. 11, 2024.
Levy, Meytal A., "Notice of Deficiencies", Israeli Patent Application No. 297895, mailed May 22, 2025.
Lu, Yilin, "First Office Action", Chinese Patent Application No. 202180041053.6, mailed May 26, 2025.
International Search Report, in corresponding PCT/US21/31094, dated Oct. 1, 2021.
Unknown, "Second Office Action", Chinese Patent Application No. 202180041053.6, mailed Oct. 15, 2025, 11 pages.
Bal, Heramb M., "Examination Report No. 1", Australian Patent Application No. 2021268349, mailed Jan. 30, 2026, 4 pages.
Dawara, Latika, "Examination Report", Indian Patent Application No. 202217069645, mailed Jan. 16, 2026, 9 pages.
Unknown, "Notice of Rejection", Chinese Patent Application No. 202180041053.6, mailed May 25, 2026, 16 pages.
Gebremikaal, Simon, "Requisition by The Examiner", Canadian Patent Application No. 3177306, mailed Apr. 29, 2026, 6 pages.

* cited by examiner

CHLORINE TOLERANCE OF CONTINUOUS ELECTRODEIONIZATION MODULES

FIELD OF TECHNOLOGY

Aspects and embodiments disclosed herein relate to devices and methods for removing contaminants, for example, dissolved silica from water including chlorine-containing compounds that exhibit improved resistance to degradation from the chlorine in the water.

SUMMARY

In accordance with an aspect, there is provided an electrochemical water treatment device. The electrochemical water treatment device may include a feed inlet fluidly connectable to a source of water including dissolved silica and a chlorine-containing compound. The electrochemical water treatment device further may include an electrochemical separation module fluidly connectable to the feed inlet, the electrochemical separation module comprising a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet. A second portion of the volume of the dilution compartment may include a second ion exchange media positioned distal to the feed inlet. The first ion exchange media may have a greater resistance to the chlorine-containing compound than the second ion exchange media.

In further embodiments, the electrochemical water treatment device may include a product outlet fluidly connected downstream of dilution compartment of the electrochemical separation module.

In some embodiments, the first ion exchange media may resist swelling due to absorption of the chlorine-containing compound to a greater extent relative to the second ion exchange media.

In some embodiments, the first portion occupies about 10% to about 30% of the volume of the dilution compartment and the second portion about 70% to about 90% of the volume of the dilution compartment.

In certain embodiments, the first ion exchange media may include a mixture of two or more ion exchange media. For example, the mixture of two or more ion exchange media may include a mixture of at least one cation exchange media and at least one anion exchange media. In particular embodiments, one of the at least one cation exchange media and at least one anion exchange media has a moisture content of between about 40-50%, such as the at least one anion exchange media.

In some embodiments, the first ion exchange media can resist the chlorine-containing compound present at a concentration of about 0.01 ppm to about 0.10 ppm over an extended period of time, such as days, weeks, or months.

In further embodiments, the first ion exchange media mat include up to about 10% v/v of an adsorbent, such as a carbonaceous adsorbent.

In some embodiments, the second ion exchange media may include an ion exchange media suitable for the removal of the dissolved silica in water from the source of water. In certain embodiments, the second ion exchange media may include a mixture of two or more ion exchange media. For example, the mixture of two or more ion exchange media may include a mixture of at least one cation exchange media and at least one anion exchange media. In particular embodiments, one of the at least one cation exchange media and at least one anion exchange media has a moisture content of between about 50-60%, such as the at least one anion exchange media.

In some embodiments, the at least one anion exchange media of the first ion exchange media may have a greater moisture content than the at least one anion exchange media of the second ion exchange media. In other embodiments, the at least one cation exchange media of the first ion exchange media and the at least one cation exchange media of the second ion exchange media have about equal moisture content.

In some embodiments, at least one of the first ion exchange media and second ion exchange media may be a microporous resin, a macroporous resin, or a cross-linked gel.

In some embodiments, a volume of the concentration compartment may include a third ion exchange media having a composition substantially similar to the first ion exchange media.

In further embodiments, the electrochemical separation module may include a plurality of dilution compartments and a plurality of concentration compartments separated by an alternating series of cation exchange membranes and anion exchange membranes.

In accordance with an aspect, there is provided a method of reducing the concentration of dissolved silica in water. The method may include directing a feed stream from a source of water including dissolved silica and a chlorine-containing compound to a feed inlet of an electrochemical separation module in an electrochemical water treatment device. The electrochemical separation module may include a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet. A second portion of the volume of the dilution compartment may include a second ion exchange media positioned distal to the feed inlet. The first ion exchange media may have a greater resistance to the chlorine-containing compound than the second ion exchange media. The method further may include applying a voltage across the first and second electrodes to produce a product stream having a reduced concentration of dissolved silica and a concentrate stream enriched in dissolved silica.

In some embodiments, directing the feed stream from the source of water to be treated may include directing water having a dissolved silica concentration of about 1 ppm.

In further embodiments, the method includes discharging a product stream having a dissolved silica concentration of about 1 ppb.

In accordance with an aspect, there is provided a method of facilitating treatment of water containing dissolved silica. The method may include providing an electrochemical water treatment device including an electrochemical water treatment device connectable to a source of water containing dissolved silica and a chlorine-containing compound. The electrochemical separation module may include a feed inlet, a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet. A second portion of the volume of the dilution compartment may include a second ion exchange media positioned distal to the feed inlet. The first ion exchange media may have a greater resistance to the chlorine-containing compound than the second ion exchange media. The method further may include providing instructions to direct wastewater from the source of water to the feed inlet of the electrochemical separation module. The method additionally may include providing instructions to apply a voltage across the first and second electrodes to produce a product stream with a reduced concentration of dissolved silica and a concentrate stream enriched in dissolved silica.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings.

DETAILED DESCRIPTION

Figure 1:
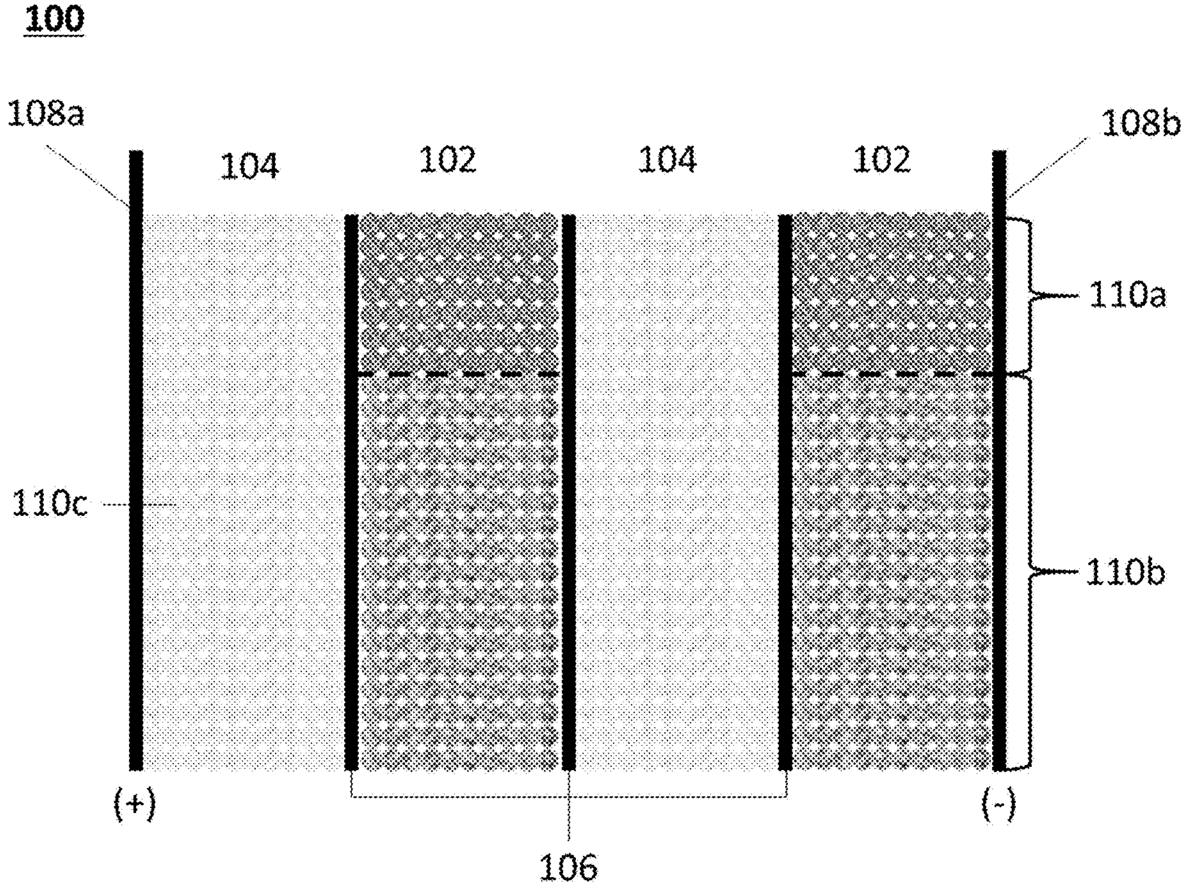
FIG. 1 illustrates an electrochemical separation module, according to one embodiment.

Ion exchange is the reversible interchange of ions between a solid (for example, an ion exchange resin) and a liquid (for example, water). Since ion exchange media act as "chemical sponges," they are well suited for effective removal of contaminants from water and other liquids. Ion exchange technology is often used in water demineralization and softening, wastewater recycling, and other water treatment processes. Ion exchange media are also used in a variety of specialized applications, for example, chemical processing, pharmaceuticals, mining, and food and beverage processing.

Devices for purifying fluids using electrical fields, i.e., electrochemical separation modules, may be used to treat water and other liquids containing dissolved ionic species. Within these modules are concentration and dilution (or depletion) compartments separated by ion-selective membranes. Electrochemical separation modules may feature alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

As used herein, the phrases "separation module," "treatment device," "purification device," or "apparatus" pertain to any device that can be used to remove or reduce the concentration level of any undesirable species from a fluid to be treated. Examples of suitable treatment apparatuses include, but are not limited to, ion-exchange resin devices, reverse osmosis (RO), electrodeionization, electrodialysis, ultrafiltration, microfiltration, and capacitive deionization devices.

In certain non-limiting embodiments, the methods and devices disclosed herein comprise an electrochemical separation module. As used herein, the phrase "electrochemical separation module" refers to any number of electrically-driven separation systems; non-limiting examples including, but not limited to, electrodeionization devices, electrodialysis devices, capacitive deionization devices, and any combination thereof. The electrochemical water treatment devices may include any device that functions in accordance with the principles of the systems and methods described herein as long as they are not inconsistent or contrary these operations.

In certain embodiments, the electrochemical separation module may include electrochemical deionization units. Non-limiting examples of such devices include electrodialysis (ED), electrodialysis reversal (EDR), electrodeionization (EDI), capacitive deionization, continuous electrodeionization (CEDI), and reversible continuous electrodeionization (RCEDI).

Electrodeionization (EDI) is a process that removes, or at least reduces, one or more ionized or ionizable species from water using one or more ion exchange media and an electric potential applied between electrodes to influence ion transport. The ion exchange media typically serves to alternately collect and discharge ionic and/or ionizable species and, in some embodiments, to facilitate the transport of ions, which may be continuously, by ionic or electronic substitution mechanisms. EDI devices can comprise electrochemically active media of permanent or temporary charge, and may be operated batch-wise, intermittently, continuously, and/or in reversing polarity modes. EDI devices may be operated to promote one or more electrochemical reactions specifically designed to achieve or enhance performance. Further, such electrochemical devices may comprise ion exchange membranes, such as semi-permeable or selectively permeable ion exchange or bipolar membranes. Continuous electrodeionization (CEDI) devices are EDI devices that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange media.

Electrodialysis (ED) devices operate on a similar principle as CEDI, except that ED devices typically do not contain electroactive media between the membranes and/or electrodes. Because of the lack of electroactive media, the operation of ED may be hindered by feed waters of low salinity because of elevated electrical resistance. Also, because the operation of ED on high salinity feed waters can result in elevated electrical current consumption, ED apparatuses have heretofore been most effectively used on source waters of intermediate salinity. In ED based systems, because there is no electroactive media, splitting water is inefficient and operating in such a regime is generally avoided.

A capacitive deionization (CapDI) device is used to remove an ionic material from a medium, for example, hard water, by applying a voltage to a pair of electrodes having nanometer-sized pores to polarize the pair of electrodes. This allows ionic material to be adsorbed onto a surface of at least one of the pair of electrodes. In the CapDI device, a low DC voltage is applied to the pair of electrodes and the medium containing dissolved ions then flows between the two electrodes. Anions dissolved in the medium are adsorbed and concentrated in the positive electrode, and cations dissolved in the medium are adsorbed and concentrated in the negative electrode. When a current is supplied in a reverse direction, for example, by electrically shorting the two electrodes, the concentrated ions are desorbed from the negative electrode and the positive electrode. Since the CapDI device does not use a high potential difference, the energy efficiency is high. The CapDI device may remove undesirable ions as well as hardness components when ions are adsorbed onto the electrodes. A CapDI device does not use a chemical to regenerate the electrodes, and therefore the CapDI device has a relatively low environmental impact.

CEDI and ED devices may include separation modules having a plurality of adjacent cells or compartments that are separated by selectively permeable membranes that allow the passage of either positively or negatively charged species, but typically not both. Dilution or depletion compartments are typically interspaced with concentrating or concentration compartments in such devices. An embodiment of an electrochemical separation module, such as used in a CEDI or ED device, is illustrated in FIG. 1. In FIG. 1, electrochemical separation module 100 includes dilution compartments 102, concentration compartments 104, and ion exchange membranes 106 separating dilution compartments 102 and concentration compartments 104. In some embodiments, there may be only one of each component, i.e., one dilution compartment 102, one concentration compartment 104, and one ion exchange membrane 106. As illustrated in FIG. 1, electrochemical separation module 100 may include a plurality of dilution compartments 102 and a plurality of concentration compartments 104 separated by an alternating series of ion exchange membranes 106, such as alternating cation exchange membranes and anion exchange membranes. In other embodiments, there may be a greater number of dilution and concentration compartments than illustrated in FIG. 1. The electrochemical separation module 100 is bounded by first and second electrodes 108*a*, 108*b*, operating as an anode and a cathode, respectively. Within the dilution compartments 102, a first portion of the volume of the dilution compartments 102 includes a first ion exchange media 110*a*. A second portion of the volume of the dilution compartments 102 includes a second ion exchange media 110*b*; the dashed line present in the dilution compartments 102 in FIG. 1 provides a visual aid for the interface between the two ion exchange media. The concentration compartment 104 includes a third ion exchange media 110*c*.

In CEDI and ED devices, a direct current (DC) electric field is typically applied across the cells from a source of voltage and electric current applied to the electrodes (anode or positive electrode, and cathode or negative electrode). The voltage and current source (collectively "power supply") can be itself powered by a variety of means such as an alternating current (AC) power source, or, for example, a power source derived from solar, wind, or wave power. At the electrode/liquid interfaces, electrochemical half-cell reactions occur that initiate and/or facilitate the transfer of ions through the membranes and compartments. For example, in FIG. 1, when a voltage is applied across the first and second electrodes, i.e., the cathode and anode, hydroxide and hydrogen ions may form in the water and may cause ions present in the water to migrate to the opposing polarity electrode.

In some embodiments, for electrodes contained within electrolyte compartments, the specific electrochemical reactions that occur at the electrode/interfaces can be controlled to some extent by the concentration of salts in the compartments. For example, a feed to the anode electrolyte compartment that is high in sodium chloride will tend to generate chlorine gas and hydrogen ions, while such a feed to the cathode electrolyte compartment will tend to generate hydrogen gas and hydroxide ions. Generally, the hydrogen ions generated in the anode compartment will associate with a free anion, such as chloride ion, to preserve charge neutrality and create hydrochloric acid solution, and analogously, the hydroxide ions generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

CEDI modules may be employed downstream of RO membranes made of a material such as a polyamide. Membranes of this type have a limited tolerance to free chlorine, such as residual chlorine from water disinfection processes, and therefore the feed water should be dechlorinated prior to treatment in a RO unit. However, system upsets do occur, for example, in dechlorination systems using a reducing agent such as sodium bisulfite, which may result in traces of free chlorine or chloramines reaching downstream CEDI modules. CEDI modules may be optimized for performance in specific treatment applications as determined by choices for membranes and ion exchange media having specific physical and chemical properties. In some instances, the aforementioned optimization may include choosing an ion exchange media having an appropriate amount of cross-linking for the specific application. CEDI modules may employ ion exchange media having about 1% to about 10% divinylbenzene (DVB) by weight as a polymeric cross-linker. As a non-limiting example, ion exchange media used for anion exchange processes may have a DVB content of about 2% by weight. As another non-limiting example, ion exchange media used for cation exchange processes may have a DVB content of about 8% by weight. The cross-linked percentage by weight is generally not specified for ion exchange media but can be inferred from its water content with an approximate 1:1 correspondence. Without wishing to be bound by any particular theory, the moisture content of an ion exchange resin is a measure of the amount of hydration water that fills the voids in the solid resin matrix, as used herein, is considered to be the maximum weight percent of water that the ion exchange media may absorb and retain when exposed to water. A resin with high moisture content includes less dry matter, i.e., the matrix that is made from polystyrene with crosslinks of divinylbenzene that bridge the polystyrene chains. Increased water content (and thus less dry matter) may provide easier access for large ions to move in and out of the structure, but the increased water content reduces the physical strength and resistance to oxidative attack of the resin, both of which are generally provided by the crosslinked polymeric structure. In some embodiments, an ion exchange media may be considered as having a "high" cross-linked content if the moisture content of the ion exchange media is between about 40% to about 50% by weight. A "low" cross-linked ion exchange media may have a moisture content between about 50% to about 60% by weight.

The removal of dissolved silica from process water may be achieved by employing high water content, low cross-linked anion exchange media having increased susceptibility to oxidizing species, such as free chlorine, as compared to low water content, highly cross-linked anion exchange media in dilution compartments of an electrically operated separation device (ED, EDI, CEDI, etc.). In use, the ion exchange media closest to the inlet of the dilution compartment may be attacked by the free chlorine in the feed water, which causes the ion exchange media to swell, and in some instances mechanically degrade or break down, causing a blockage of the water flow through the entire electrochemical separation module. These blockages may result in permanent damage which requires rebuilding or replacement of the entire electrochemical separation module. It would therefore be desirable to include one or more ion exchange media within an electrochemical separation module that can treat water containing oxidizing ions and molecules without sustaining permanent damage or a loss of treatment performance.

In accordance with an aspect, there is provided a water treatment device including a feed inlet fluidly connected or connectable to a source of water including dissolved silica and a chlorine-containing compound and an electrochemical separation module fluidly connected or connectable to the feed inlet. The electrochemical separation module may include a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet. A second portion of the volume of the dilution compartment may be positioned distal to the feed inlet. The second portion of the volume of the dilution compartment may include a second ion exchange media having a greater resistance to the chlorine-containing compound, such as a greater resistance to swelling or fracturing upon absorption or adsorption of the chlorine-containing compound, than the second ion exchange media. The water treatment system further may include a product outlet fluidly connected downstream of the electrochemical separation module. The product outlet may be positioned to discharge treated water to a further downstream treatment step or to a point of use.

Figure 2:
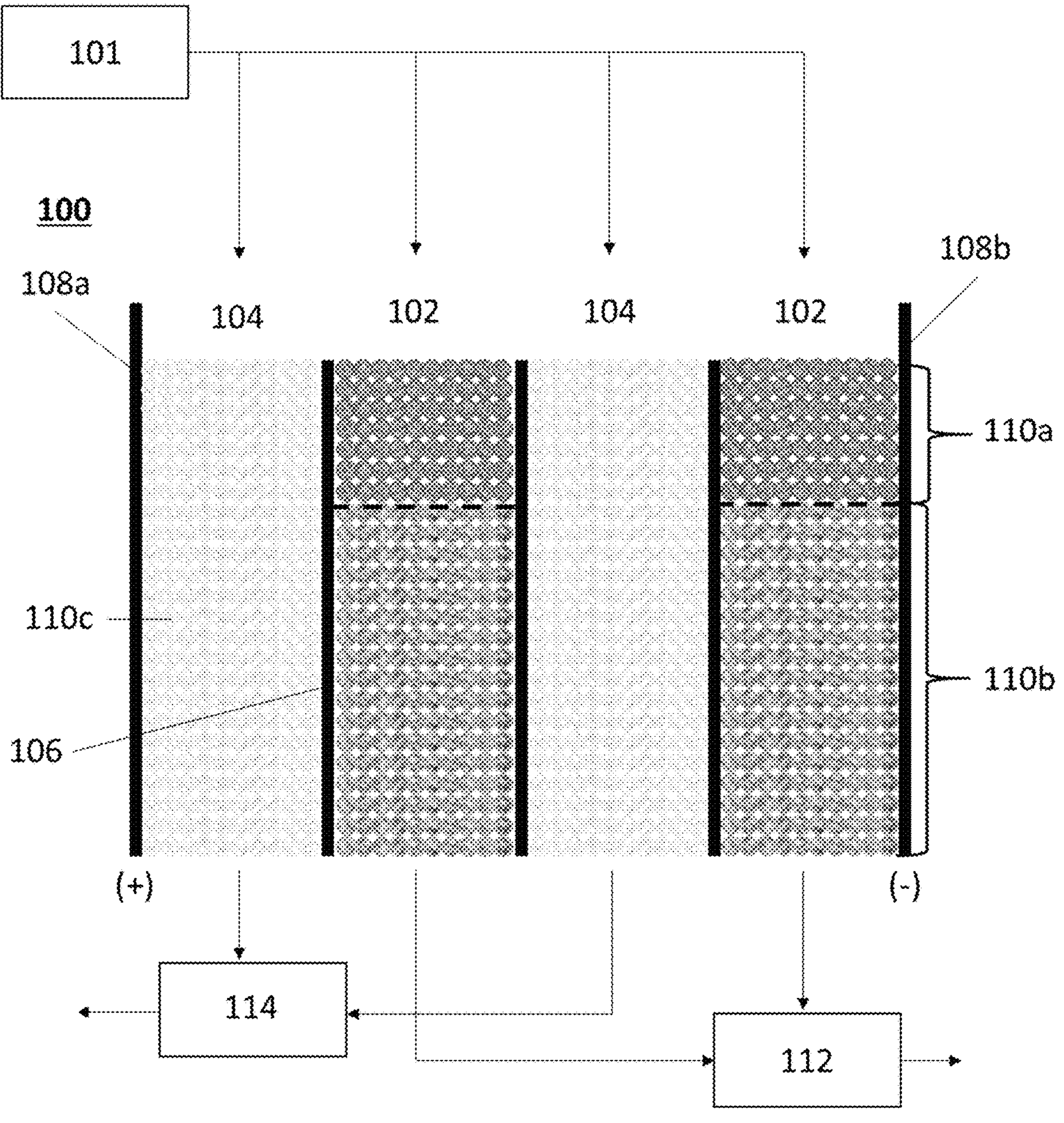
FIG. 2 illustrates a water treatment system incorporating the electrochemical separation module of FIG. 1, according to one embodiment.

An embodiment of a water treatment device incorporating the electrochemical separation module illustrated in FIG. 1 is shown in FIG. 2. As shown, feed inlet 101, connected or connectable to a source of water including dissolved silica and a chlorine-containing compound to be treated (not shown) is positioned to distribute water from the source of water into the dilution compartments 102 and concentration compartments 104 of the electrochemical separation module 100. As water flows through the depletion compartments 102 (shown as arrows in FIG. 2), ionic and other charged species are typically drawn into concentrating compartments 104 under the influence of an electric field, such as a DC field. Positively charged species are drawn toward a cathode, such as second electrode 108*b* located at one end of a stack of multiple depletion compartments 102 and concentration compartments 104, and negatively charged species are likewise drawn toward an anode such as first electrode 108*a*, located at the opposite end of the stack of compartments. The first and second electrodes 108*a*, 108*b* are typically housed in electrolyte compartments (not shown) that may be partially isolated from fluid communication with the depletion compartments 102 and/or concentration compartments 104. Once in a concentration compartment 104, charged species may be trapped by a barrier of an ion exchange membrane 106 that may at least partially define the concentration compartment 104. For example, anions may be prevented from migrating further toward the second electrode 108*b* and out of the concentration compartment 104 by a cation exchange membrane. Treated water in the dilution compartments 102 may be discharged out of product outlet 112 fluidly connected downstream of the electrochemical separation module 100. Once captured in the concentrating compartment 104, trapped charged species can be removed in a concentrate stream and discharged to waste outlet 114.

In some embodiments, the portion of the volume of the dilution compartment positioned proximate the feed inlet may include an ion exchange media having a greater resistance to the chlorine-containing compound, such as a greater resistance to swelling or fracturing, than the ion exchange media in the portion of the dilution compartment distal the feed inlet downstream of the portion proximate the feed inlet. The first portion of the volume of the dilution compartment may occupy about 10% to about 30% of the volume of the dilution compartment, such as the first portion of the dilution compartment 102 with first ion exchange media 110*a* illustrated in FIG. 1. The choice for the volume of the dilution compartment occupied by the first ion exchange media may be determined by a number of factors, including but not limited to, inlet water quality, desired treated water quality, flow rates, and residence time of water in the electrochemical cell. For example, the first portion of the volume of the dilution compartment may occupy about 10% to about 30% of the volume of the dilution compartment, about 15% to about 25% of the volume of the dilution compartment, or about 20% of the volume of the dilution compartment, e.g., about 10%, about 15%, about 20%, about 25%, or about 30% of the volume of the dilution compartment. Without wishing to be bound by any particular theory, the placement of an ion exchange media more resistant to swelling or other reactions from oxidizing species such as chlorine-containing compounds closer to the feed inlet may allow the water, following contact with the first ion exchange media, to have a lower concentration of said chlorine-containing compounds and thus be less likely to swell or compromise the structural integrity of other ion exchange media present in the dilution compartment, such as in a second portion of the volume of the dilution compartment.

In some embodiments, the second portion of the volume of the dilution compartment, such as the second portion of the dilution compartment 102 with second ion exchange media 110*b* illustrated in FIG. 1, may occupy about 70% to about 90% of the volume of the dilution compartment. For example, the second portion of the volume of the dilution compartment may occupy about 70% to about 90% of the volume of the dilution compartment, about 75% to about 85% of the volume of the dilution compartment, or about 80% of the volume of the dilution compartment, e.g., about 70%, about 75%, about 80%, about 85%, or about 90% of the volume of the dilution compartment.

In some embodiments water treatment systems disclosed herein, one or both of the first ion exchange media and the second ion exchange media may include a mixture of two or more ion exchange media. For example, one or both of the first ion exchange media and the second ion exchange media may be a mixture of at least one least one cation exchange media and at least one anion exchange media. The specific type(s) and specific amounts (% w/w or % v/v, for example) of each type of ion exchange media may be determined by the properties of the water to be treated, such as chemical composition. In some embodiments, a binary mixture of a cation exchange media and an anion exchange media may be in equal amount, e.g., 50% of each polarity media in the mixture. Alternatively, the relative amounts of each polarity of ion exchange media may be determined, in part, by the balance between resistance to chemical attack and ion transport performance. For example, in water having an elevated concentration of oxidizing species, for example, chlorine or chlorine-containing compounds, such as greater than about 0.02 ppm, the first ion exchange media may have a component media chosen to have a greater resistance to the chlorine-containing compounds than a corresponding component media in the second ion exchange media. As described herein, an ion exchange media, i.e., a cation exchange media or an anion exchange media, having a greater resistance to the chlorine-containing compounds may have a higher cross-linked content and thus a lower moisture content. In some embodiments, at least one of the at least one cation exchange media and at least one anion exchange media may have a moisture content of between about 40-50%, e.g., a moisture content of about 40%, 41%, 42%, 43%, 44%, 45%, 46%, 47%, 48%, 49%, or 50%. Oxidizing species are generally anions, e.g., halide ions or peroxide ions, in water and thus the anion exchange resin of the first ion exchange media may have a moisture content of between about 40-50%, i.e., an increased cross-linked content, to resist absorption of and subsequent swelling or damage from oxidizing species present in the water. In some embodiments, the first ion exchange media can resist swelling or structural damage in water having a concentration of oxidizing species of about 0.01 ppm to about 0.10 ppm such that the swelling or structural damage to the first ion exchange media is undetectable after a prolonged period of exposure to such water, for example, over a period of multiple days or multiple weeks. For example, the first ion exchange media can resist structural damage in water having a concentration of oxidizing species of about 0.01 ppm to about 0.10 ppm, e.g., about 0.01 ppm to about 0.10 ppm, about 0.02 ppm to about 0.09 ppm, about 0.03 ppm to about 0.08 ppm, about 0.04 ppm to about 0.07 ppm, or about 0.05 ppm, e.g., about 0.01 ppm, about 0.02 ppm, about 0.03 ppm, about 0.04 ppm, about 0.05 ppm, about 0.06 ppm, about 0.07 ppm, about 0.08 ppm, about 0.09 ppm, or about 0.10 ppm.

In some embodiments, the first ion exchange media further may include an adsorbent to reduce the contaminant load of water from the source of water entering the electrochemical separation module. The adsorbent may be any suitable adsorbent useful for treating water, such as carbonaceous adsorbent, e.g., activated carbon, a zeolite, a metal sponge, or other similar adsorbents. In some non-limiting embodiments, the adsorbent may be a bead-form activated carbon adsorbent of a fixed particle size. For example, suitable carbonaceous adsorbents include but are not limited to, A-BAC-MP (average particle size 0.5 mm) or A-BAC-LP (average particle size 0.6 mm) available from Kureha Corporation (Tokyo, Japan). Other suitable adsorbents are known in the art. The adsorbent may be present in the first ion exchange media up to about 10% v/v, e.g., about 1% v/v, about 2% v/v, about 3% v/v, about 4% v/v, about 5% v/v, about 6% v/v, about 7% v/v, about 8% v/v, about 9% v/v, or about 10% v/v.

In some embodiments, the second ion exchange media comprises an ion exchange media suitable for the removal of silica in water from the source of water. As described herein, the choice of ion exchange media for any portion of the dilution compartment may be determined by the balance between resistance to a chlorine-containing compound, such as resistance to swelling or structural damage upon exposure to chlorine, and the ion transport performance. As a particular example, the transport of dissolved silica, a bulky cation, between compartments of an electrochemical separation module may be accomplished using a cation exchange media with about 5-10% cross-linked content. In other embodiments, silica removal may not be a consideration for the ion exchange media within the compartments of the electrochemical separation module. In this configuration, high cross-linked, i.e., lower moisture content, ion exchange media can be used throughout dilution compartments and in the concentration compartments of the electrochemical separation module.

As described herein, an ion exchange media, i.e., a cation exchange media or an anion exchange media, used in the second portion of the volume of the dilution compartment may have a lower cross-linked content and thus a higher moisture content. In these embodiments, these types of ion exchange media may be more suited for ion transport rather than resistance to structural damage due to uptake or absorption of oxidizing species such as chlorine-containing compounds. Water treatment using these types of ion exchange media may operate under conditions where the concentration of chlorine-containing compounds is reduced by the first ion exchange media in the first portion of the volume of the dilution compartment. In some embodiments of the second ion exchange media in the second portion of the volume of the dilution compartment, at least one of the at least one cation exchange media and at least one anion exchange media may have a moisture content of between about 50-60%, e.g., a moisture content of about 50%, 51%, 52%, 53%, 54%, 55%, 56%, 57%, 58%, 59%, or 60%. In particular embodiments, the at least one anion exchange media has a moisture content of between about 50-60%. Within the dilution compartment, the at least one anion exchange media of the first ion exchange media may have a greater moisture content than the at least one anion exchange media of the second ion exchange media. As disclosed herein, the relative moisture content and degree of cross-linking, between the first and second ion exchange media in the dilution compartment may be determined based on water quality of feed water into the dilution compartment and desired ion transport performance. Due to the anionic nature of most chlorine-containing compounds, the at least one cation exchange media in the each of the first and second ion exchange media is in general not affected by the chlorine-containing compounds. Thus, the moisture content and degree of cross-linking of the cation exchange media in the first and second ion exchange media may be about equal.

This relative ratio may be adjusted as needed to satisfy performance metrics and embodiments of the invention disclosed herein are not limited to having cation exchange media with equal moisture content in the different portions of the volume of the dilution compartment.

In some embodiments of any electrochemical water treatment device disclosed herein, one or both of the first ion exchange media and the second ion exchange media may be of any physical form suitable for a disclosed application. For example, one or both of the first ion exchange media and the second ion exchange media may include a cross-linked gel media, a microporous resin, or a macroporous resin. The choice of form may depend on the size of the electrochemical treatment module, quality of water to be treated and the desired quality of water following treatment. As a non-limiting example, in a thin-cell electrochemical separation module, with a dilution or concentration compartment thickness of 2.0 to 3.0 mm, a high cross-linked, lower moisture (e.g., 40-50% moisture content) ion exchange media can be employed in a first portion of the dilution compartment under operating conditions that does not result in water splitting. A less cross-linked, higher moisture content (e.g., 50-60% moisture content) ion exchange media could be used in the second portion of the dilution compartment where a majority of silica transfer to the concentration compartment may occur. As another non-limiting example, in a thick-cell electrochemical separation module having a dilution and/or concentration compartment thickness of about 10 mm, it has been observed that ion exchange media in the first portion of the dilution compartment including both Type I and Type II strong base anion resins and mixtures thereof have been susceptible to structural damage upon exposure to the oxidizing species in the water. In this configuration, a high cross-linked gel ion exchange media or a macroporous ion exchange media would serve the purpose of controlling the conductivity, and hence the ion transport performance, of the ion exchange media in the first portion of the dilution compartment without sacrificing the structural integrity of the ion exchange media.

In some embodiments of electrochemical water treatment devices disclosed herein, a volume of the concentration compartment includes a third ion exchange media having a composition substantially similar to the first ion exchange media. The third ion exchange media may be a mixture of two or more ion exchange media, such as a mixture of at least one cation exchange media and at least one anion exchange media as described herein. "Substantially similar," as used herein, refers to the physical and chemical composition of two different ion exchange media having at least one component of the ion exchange media being identical and present in relative amounts within 10%. For example, the third ion exchange media in the concentration compartment may have the same combination of anion exchange media and cation exchange media as either the first ion exchange media or the second ion exchange media of the dilution compartment but in a different mass or weight percentage of each component. As a simplified example illustration, the first ion exchange media may include 60% by mass of media A and 40% by mass of media B with the third ion exchange media including 50% by mass of media A and 50% by mass of media B. The relative ratios of ion exchange media present in the third ion exchange media may be chosen to balance performance of the dilution compartment and the discharge of concentrate from the concentration compartments and reduce pressure drops through the dilution and concentration compartments.

In accordance with an aspect, there is provided a method of reducing a concentration of dissolved silica in water. The method may include directing a feed stream from a source of water including dissolved silica and a chlorine-containing compound to a feed inlet of an electrochemical separation module in an electrochemical water treatment device. The method further may include applying a voltage across the first and second electrodes to produce a product stream having a reduced concentration of dissolved silica and a concentrate stream enriched in dissolved silica. The electrochemical separation module may include a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet. A second portion of the volume of the dilution compartment may include a second ion exchange media positioned distal to the feed inlet, the first ion exchange media may have a greater resistance to the chlorine-containing compound than the second ion exchange media.

In some embodiments, directing the feed stream from the source of water to be treated includes directing water having a dissolved silica concentration of about 1 ppm. In some embodiments, discharging the product stream comprises discharging a product stream having a dissolved silica concentration of about 1 ppb.

In accordance with an aspect, there is provided a method of facilitating treatment of water containing dissolved silica. The method may include providing an electrochemical water treatment device connectable to a source of water containing dissolved silica and a chlorine-containing compound. The provided electrochemical separation module may include a feed inlet, a dilution compartment, a concentration compartment, an ion exchange membrane positioned between the dilution compartment and the concentration compartment, and first and second electrodes. A first portion of a volume of the dilution compartment may include a first ion exchange media positioned proximate to the feed inlet and a second portion of the volume of the dilution compartment may include a second ion exchange media positioned distal to the feed inlet. The first ion exchange media may have a greater resistance to the chlorine-containing compound than the second ion exchange media. The method further may include providing instructions to direct wastewater from the source of water to the feed inlet of the electrochemical separation module. The method additionally may include providing instructions to apply a voltage across the first and second electrodes to produce a product stream with a reduced concentration of dissolved silica and a concentrate stream enriched in dissolved silica.

EXAMPLES

The function and advantages of these and other embodiments can be better understood from the following examples. These examples are intended to be illustrative in nature and are not considered to be in any way limiting the scope of the invention.

The following Examples reference specific ion exchange media available from commercial suppliers. Example cation exchange media suitable for use in an electrochemical separation module of this disclosure include, but are not limited to, C-211 UPS (moisture content 42-48% in $Na^+$ form, 8% cross-linked) and C-373 (moisture content 40-45% in $Na^+$ form, 10% cross-linked) resins, both strong acid cation exchange media available from Evoqua Water Technologies, LLC (Pittsburgh, PA). Example anion exchange media suitable for use in an electrochemical separation module of this disclosure include, but are not limited to, Type 1 strong base anion exchange media such as DOWEX™ MARATHON™ A (moisture content 50-60% in $Cl^-$ form) and DOWEX™ MONOSPHERE™ 550A (moisture content 42-48% in $Cl^-$ form) resins, both available from the Dow Chemical Company (Midland, MI), and Type 2 strong base anion exchange media. These media types are only illustrative examples, and aspects and embodiments disclosed herein are not limited by the specific type and/or manufacturer of the ion exchange media.

Example 1

Table 1 illustrates a comparison between ion exchange media configurations of different electrochemical separation modules (A-D) to evaluate resistance to media swelling and/or breakdown due to chloride ion uptake and the impact on silica removal performance.

TABLE 1

| Electrochemical separation module ion exchange media configurations | |
|---|---|
| Modules | Ion Exchange Media Mixtures |
| A | 50% MARATHON ™ A, 50% C-211 UPS |
| B | 50% C-373, 50% MARATHON ™ A |
| C | First portion of dilution compartment - 60% C-373, 40% MONOSPHERE ™ 550A<br>Second portion of dilution compartment - 50% C-211 UPS, 50% MARATHON ™ A<br>First portion of concentration compartment (20% of compartment volume) - 50% C-373, 50% MONOSPHERE ™ 550A<br>Second portion of concentration compartment (80% of compartment volume) - 50% C-211 UPS, 50% MARATHON ™ A |
| D | 50% C-373, 50% MONOSPHERE ™ 550A |

Figure 3A:
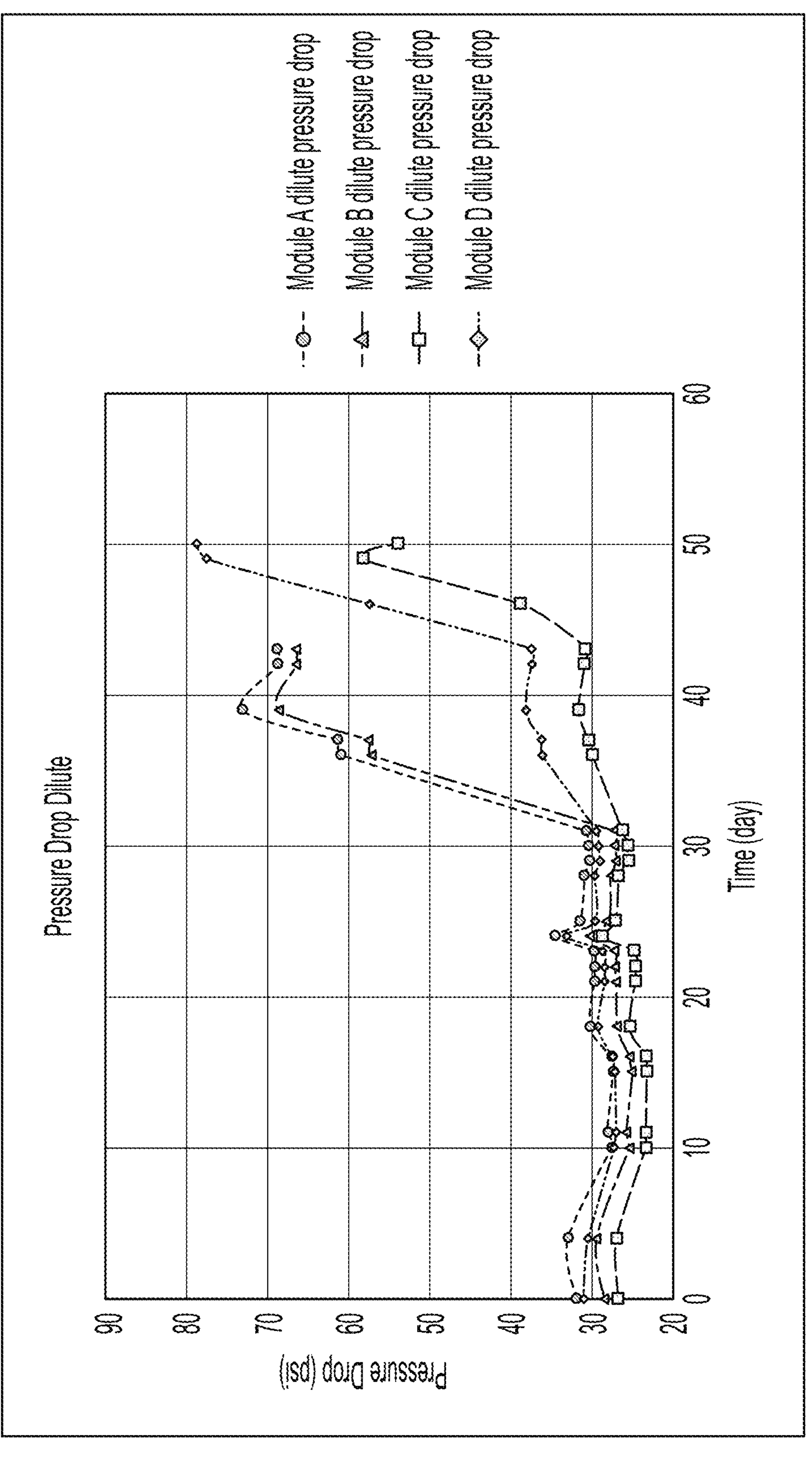
FIG. 3A illustrates the pressure drop across the dilution compartment for electrochemical separation modules with different ion exchange media configurations.
Figure 3B:
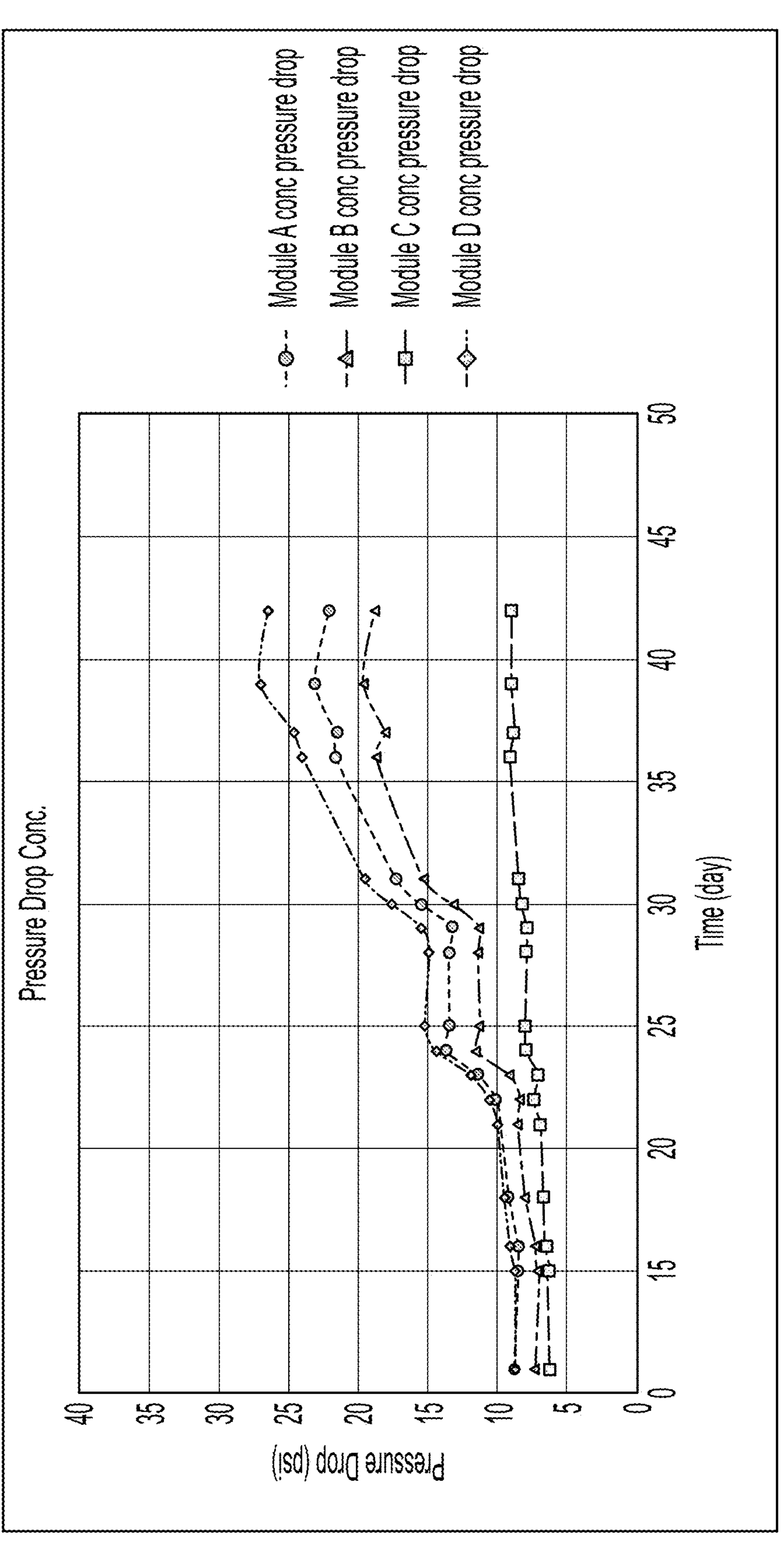
FIG. 3B illustrates the pressure drop across the concentration compartment for electrochemical separation modules with different ion exchange media configurations.
Figure 4:
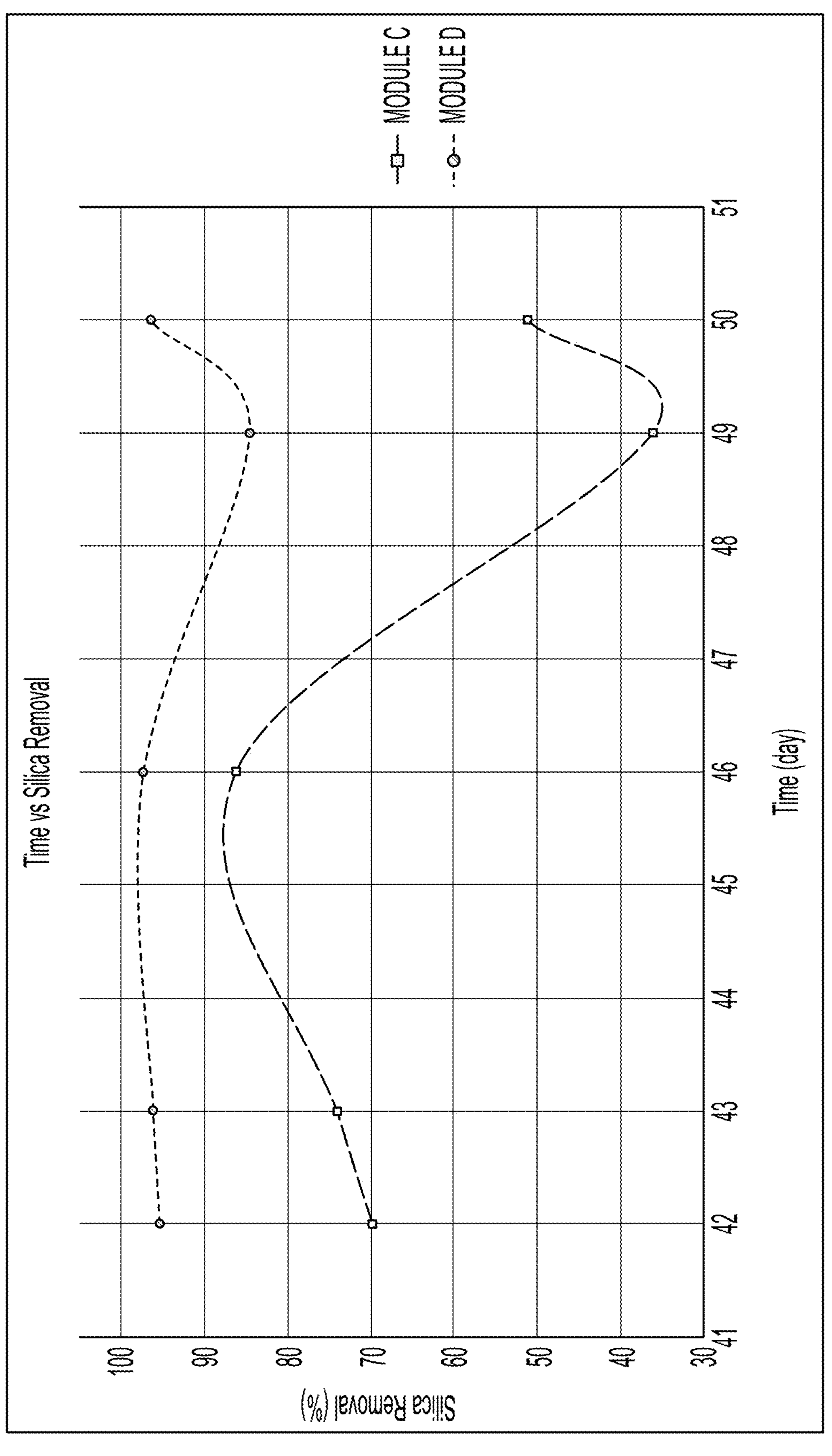
FIG. 4 illustrates the silica removal performance for electrochemical separation modules having different ion exchange media configurations.

Relative to Module A, Module B used a higher cross-linked cation resin (C-373) but the same anion resin (MARATHON™ A), so this configuration did not address the known issues with a lower cross-linked anion exchange media swelling or being degraded by chlorine present in the feed water to the electrochemical separation module. Module configurations C and D showed a delayed onset of a pressure drop increase in the dilution compartment, as illustrated in FIGS. 3A and 3B. The delayed onset of the pressure drop was attributed to the ion exchange media in modules A and B swelling or losing its structural integrity in the electrochemical separation module more quickly, fracturing to the point of forming blockages within the module restricting flow in and out. Module C showed no loss of silica removal performance, while module D gave noticeably worse silica removal performance as illustrated in FIG. 4.

Example 2

Table 2 illustrates a comparison between the ion exchange media configuration of Module C from Table 1 and changes to its ion exchange media configuration (Module CD and Concentrate) to evaluate resistance to media swelling or breakdown due to chloride ion uptake, the silica removal performance, and resultant water quality.

TABLE 2

| Electrochemical separation module ion exchange media configurations | |
|---|---|
| Modules | Ion Exchange Media Mixtures |
| C | First portion of dilution compartment (20% of compartment volume) - 60% C-373, 40% MONOSPHERE ™ 550A<br>Second portion of dilution compartment (80% of compartment volume) - 50% C-211 UPS, 50% MARATHON ™ A<br>First portion of concentration compartment (20% of compartment volume) - 50% C-373, 50% MONOSPHERE ™ 550A<br>Second portion of concentration compartment (80% of compartment volume) - 50% C-211 UPS, 50% MARATHON ™ A |
| CD | First portion of dilution compartment (20% of compartment volume) - 60% C-373, 40% MONOSPHERE ™ 550A<br>Second portion of dilution compartment (80% of compartment volume) - 50% C-211 UPS, 50% MARATHON ™ A<br>Concentration compartment (100% of compartment volume) - 50% C-373, 50% MONOSPHERE ™ 550A |

Figure 5A:
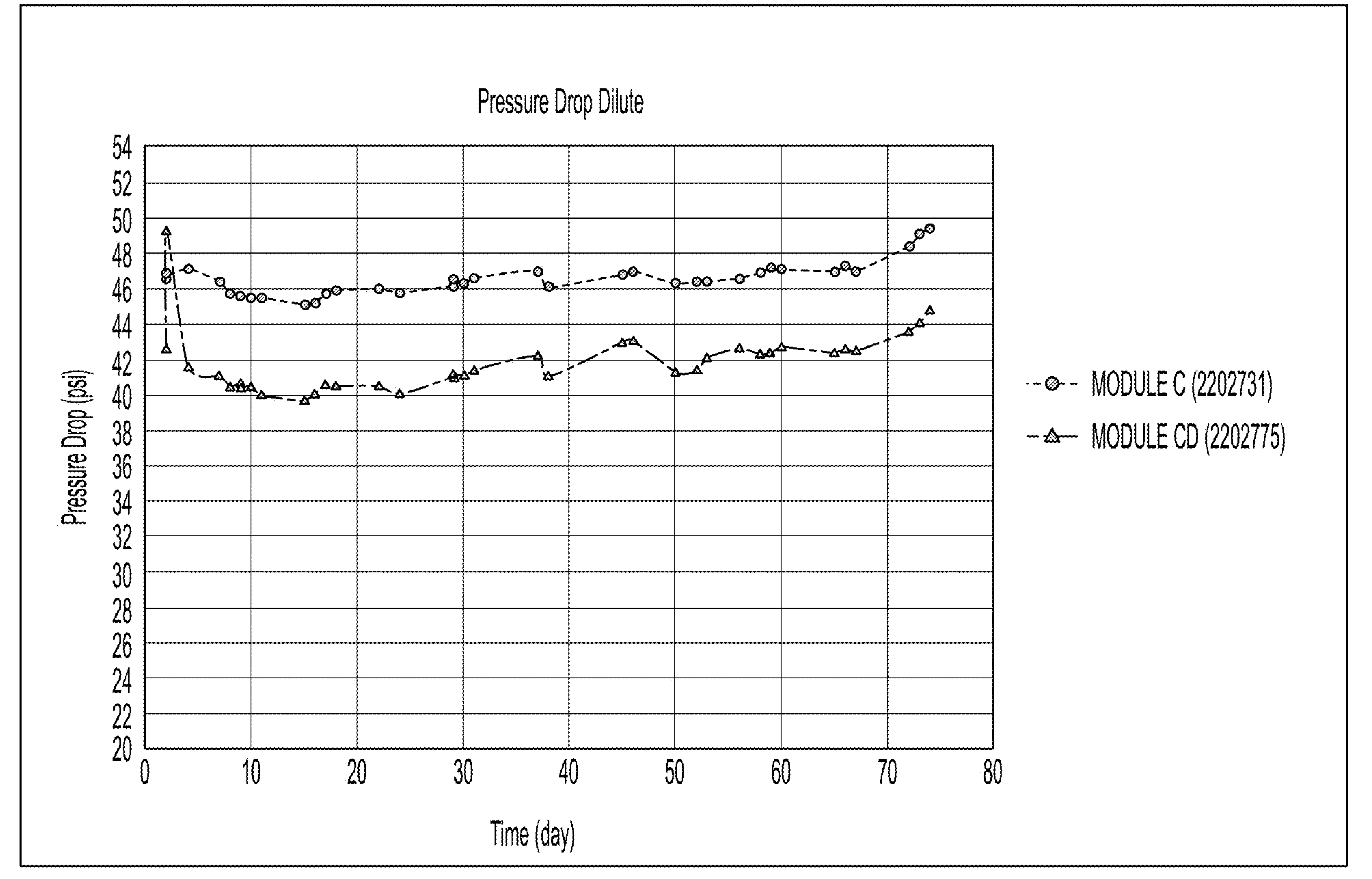
FIG. 5A illustrates the pressure drop across the dilution compartment for electrochemical separation modules with different ion exchange media configurations from those illustrated in FIG. 3A.
Figure 5B:
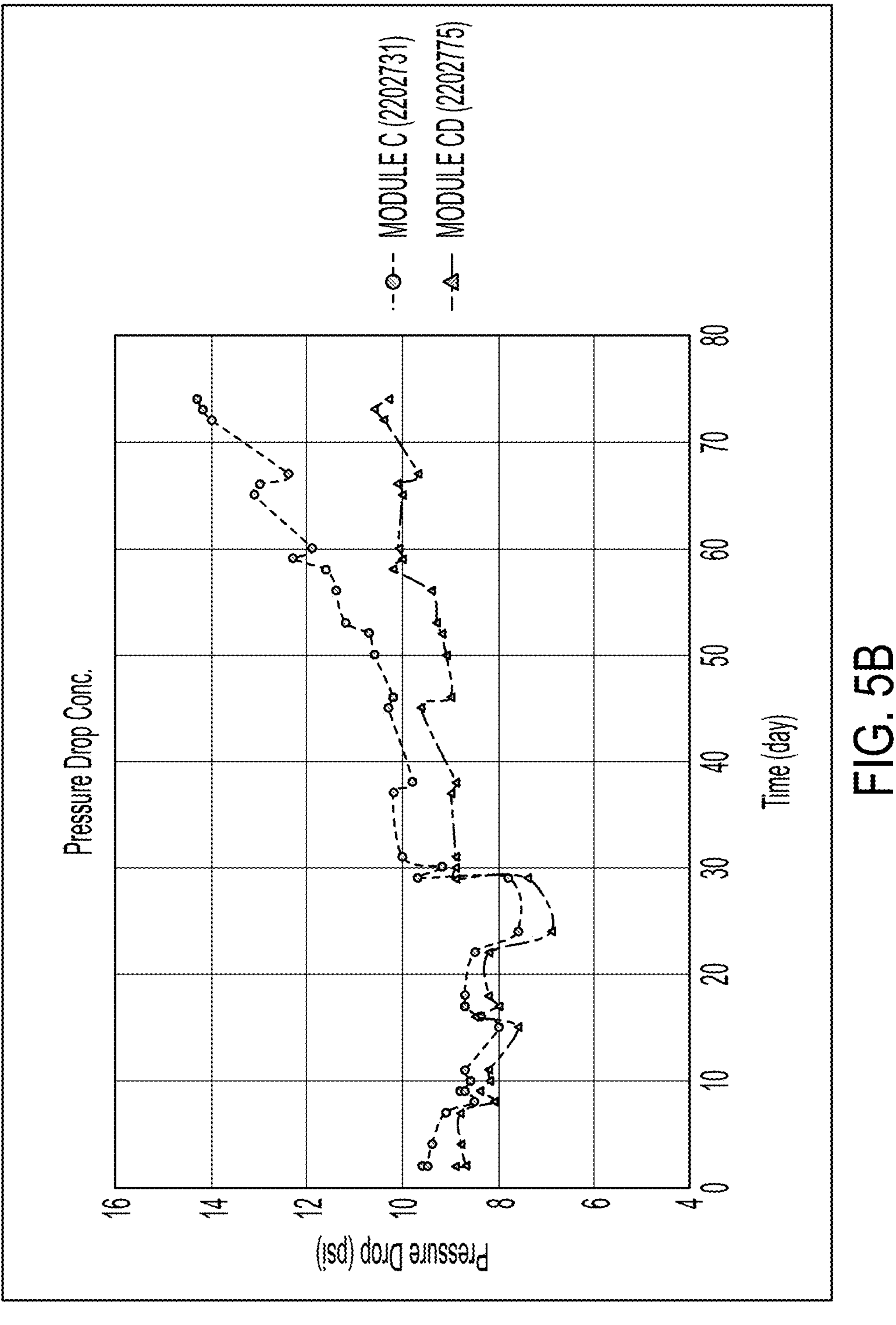
FIG. 5B illustrates the pressure drop across the concentration compartment for electrochemical separation modules with different ion exchange media configurations from those illustrated in FIG. 3B.
Figure 6:
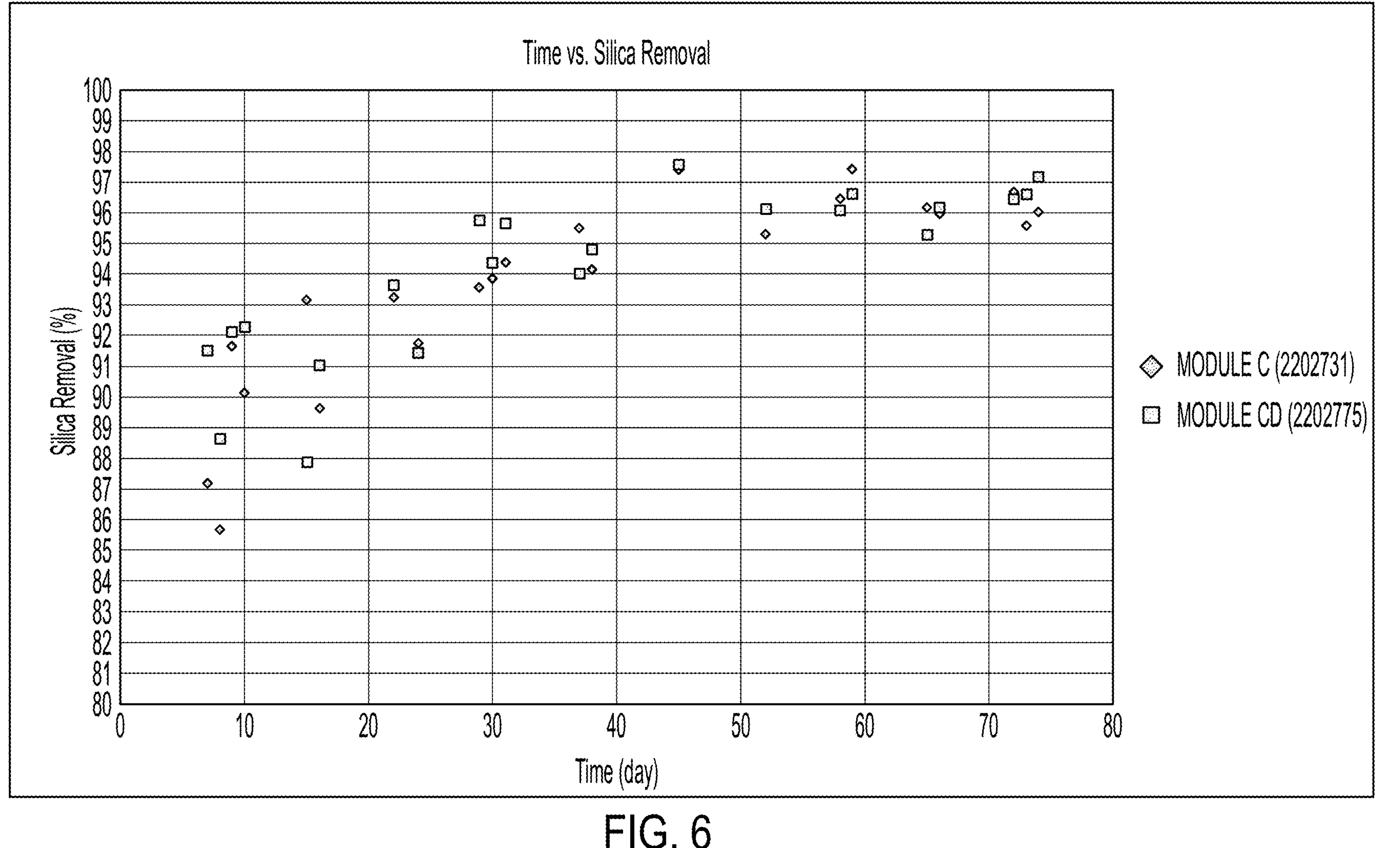
FIG. 6 illustrates the silica removal performance for electrochemical separation modules having different ion exchange media configurations.
Figure 7:
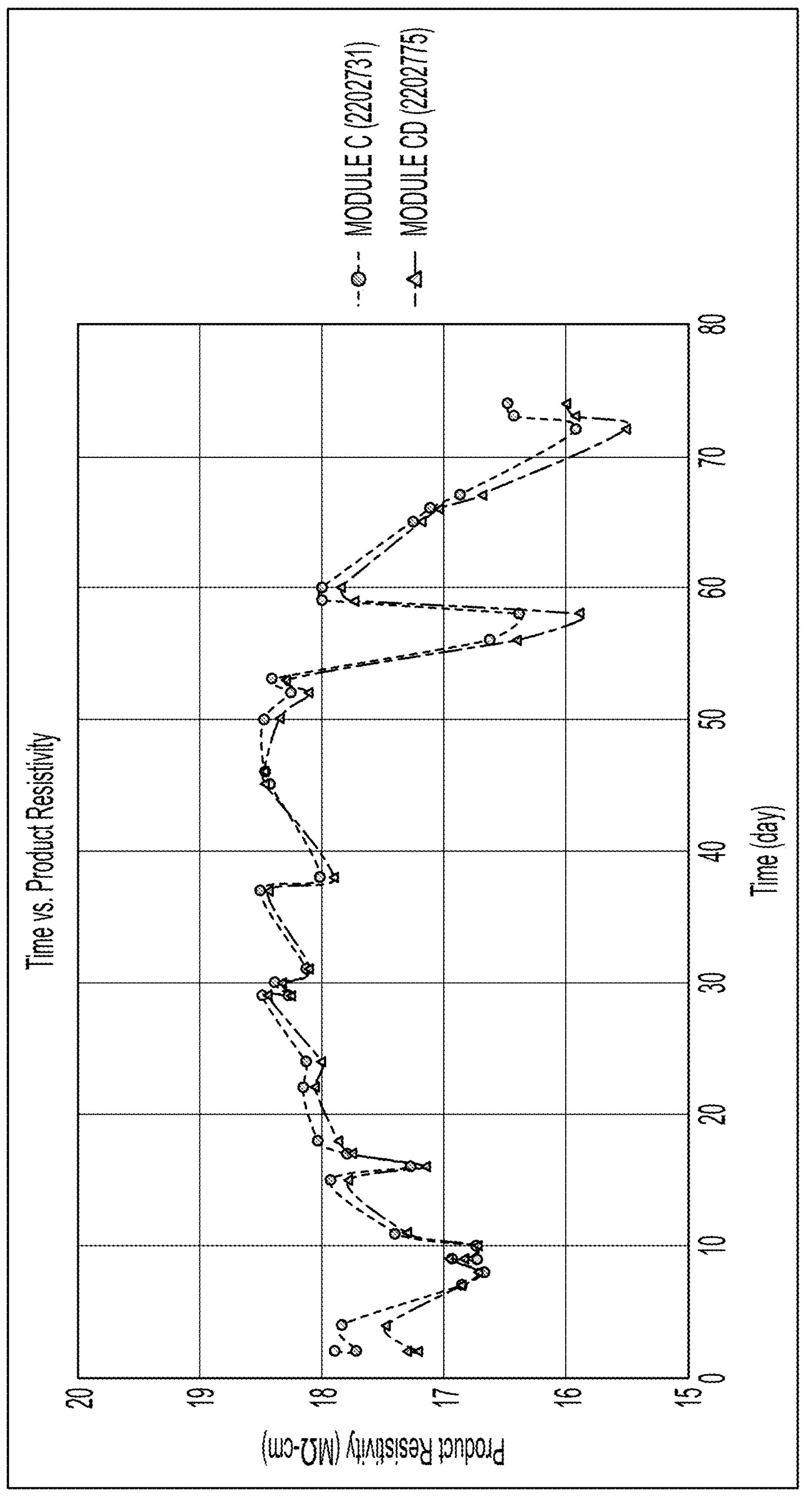
FIG. 7 illustrates the treated water resistivity for electrochemical separation modules having different ion exchange media configurations.

As illustrated in FIGS. 5A-5B, module configurations C and CD both had relatively stable pressure drop changes in the dilution compartments (FIG. 5A) and concentration compartments (FIG. 5B) over an approximately three month period. This indicated stability of the ion exchange media in the presence of any oxidizing species in the feed water to the electrochemical separation module. Module C included a first portion of the concentration compartment having a higher cross-linked resin, about 20% of the compartment volume, with the remainder of the compartment volume including a lower cross-linked resin. Module CD included the entirety of the volume of the concentration compartment filled with the higher cross-linked resin. Module configuration CD was chosen for further testing due to the greater percentage of higher cross-linked ion exchange media in the concentration compartment, as compared to module configuration D in Table 1, which resulted in less pressure drop. As illustrated in FIGS. 6 and 7, module configurations C and CD exhibited approximately equal performance, as evidenced in a comparison of silica removal (FIG. 6) and in treated water resistivity (FIG. 7).

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. An electrochemical water treatment device, comprising:

- a feed inlet fluidly connectable to a source of water including dissolved silica and a chlorine-containing compound; and
- an electrochemical separation module fluidly connectable to the feed inlet, the electrochemical separation module comprising a dilution compartment, a concentration compartment, an ion exchange membrane positioned between the dilution compartment and the concentration compartment, and first and second electrodes,
- a first portion of a volume of the dilution compartment including a first anion exchange media positioned proximate to the feed inlet,
- a second portion of the volume of the dilution compartment including a second anion exchange media positioned distal to the feed inlet, the first anion exchange media having a greater resistance to the chlorine-containing compound than the second anion exchange media,
- the concentration compartment including at least one ion exchange media having a composition different from the first anion exchange media and different from the second anion exchange media,
- wherein the first portion occupies about 10% to about 30% of the volume of the dilution compartment.

2. The device of claim 1, further comprising a product outlet fluidly connected downstream of the dilution compartment of the electrochemical separation module.

3. The device of claim 1, wherein the first anion exchange media resists swelling due to absorption of the chlorine-containing compound to a greater extent relative to the second anion exchange media.

4. The device of claim 1, wherein the second portion occupies about 70% to about 90% of the volume of the dilution compartment.

5. The device of claim 1, wherein the first anion exchange media further comprises up to about 10% v/v of an adsorbent.

6. The device of claim 1, wherein the second anion exchange media has a greater moisture content than the first anion exchange media.

7. The device of claim 1, wherein the first portion of the volume of the dilution compartment includes a mixture of two or more ion exchange media.

8. The device of claim 7, wherein the mixture of two or more ion exchange media comprises a mixture of at least one cation exchange media and at least one anion exchange media.

9. The device of claim 8, wherein one of the at least one cation exchange media and at least one anion exchange media has a moisture content of between about 40-50%.

10. The device of claim 9, wherein the at least one anion exchange media has the moisture content of between about 40-50%.

11. The device of claim 8, wherein the second portion of the volume of the dilution compartment includes a mixture of two or more ion exchange media.

12. The device of claim 11, wherein the mixture of two or more ion exchange media comprises a mixture of at least one cation exchange media and at least one anion exchange media.

13. The device of claim 12, wherein one of the at least one cation exchange media and at least one anion exchange media has a moisture content of between about 50-60%.

14. The device of claim 13, wherein the at least one anion exchange media has the moisture content of between about 50-60%.

15. The device of claim 12, wherein the at least one cation exchange media of the first portion of the volume of the dilution compartment and the at least one cation exchange media of the second portion of the volume of the dilution compartment have about equal moisture content.

16. The device of claim 8, wherein at least one of the first anion exchange media and second anion exchange media comprises a microporous resin, a macroporous resin, or a cross-linked gel.

17. The device of claim 1, wherein the electrochemical separation module comprises a plurality of dilution compartments and a plurality of concentration compartments separated by an alternating series of cation exchange membranes and anion exchange membranes.

18. The device of claim 1, wherein the first anion exchange media disposed in the first portion of the volume of the dilution compartment consists of a single type of anion exchange resin.

19. The device of claim 1, wherein the second anion exchange media disposed in the second portion of the volume of the dilution compartment consists of a single type of anion exchange resin.

20. A method of reducing the concentration of dissolved silica in water, the method comprising:

- directing a feed stream from a source of water including dissolved silica and a chlorine-containing compound to the feed inlet of the electrochemical separation module in the electrochemical water treatment device of claim 1;
- and applying a voltage across the first and second electrodes to produce a product stream having a reduced concentration of dissolved silica and a concentrate stream enriched in dissolved silica.

21. The method of claim 20, wherein the directing the feed stream from the source of water including dissolved silica and a chlorine-containing compound includes directing water having a dissolved silica concentration of about 1 ppm.

22. The method of claim 20, further comprising discharging a product stream having a dissolved silica concentration of about 1 ppb.

23. A method of facilitating treatment of water containing dissolved silica, the method comprising:

providing the electrochemical water treatment device of claim 1;

directing wastewater from a source of water to the feed inlet of the electrochemical separation module; and applying a voltage across the first and second electrodes to produce a product stream with a reduced concentration of dissolved silica and a concentrate stream enriched in dissolved silica.

* * * * *